(12) United States Patent
Gunderson et al.

(10) Patent No.: US 9,341,261 B2
(45) Date of Patent: May 17, 2016

(54) TORQUE CONVERTER CLUTCH CONTROL VALVE SYSTEM

(71) Applicant: GM Global Technology Operations LLC, Detroit, MI (US)

(72) Inventors: Joel H. Gunderson, Canton, MI (US); Derek Kinch, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/330,651

(22) Filed: Jul. 14, 2014

(65) Prior Publication Data

US 2016/0010699 A1    Jan. 14, 2016

(51) Int. Cl.
*F16H 61/14*    (2006.01)
*F16H 41/30*    (2006.01)

(52) U.S. Cl.
CPC ............... *F16H 61/14* (2013.01); *F16H 41/30* (2013.01)

(58) Field of Classification Search
None
See application file for complete search history.

(56) References Cited

U.S. PATENT DOCUMENTS

| 4,641,549 A | * | 2/1987 | Muller | F16H 47/07 477/124 |
| 2003/0168299 A1 | * | 9/2003 | Holler | F16D 33/06 192/3.57 |

* cited by examiner

*Primary Examiner* — Richard Lorence

(57) ABSTRACT

A torque converter clutch (TCC) control valve system for a motor vehicle transmission includes a dual valve assembly with a first exhaust line that opens to air and a TCC control valve assembly with a second exhaust line that opens to air. The TCC control valve assembly communicates with the dual valve assembly through a fluid line, and the TCC control valve assembly further communicates with a torque converter having a lockup clutch. When the lockup clutch is in a faulted open state, air is drawn into the dual valve assembly through the first exhaust line. The air flows through the dual valve assembly and from the dual valve assembly though the fluid line to portions of the TCC control valve assembly, and from the TCC control valve assembly to the torque converter. The air replaces hydraulic fluid in the torque converter, and the displaced hydraulic fluid from the torque converter exits through the second exhaust line.

20 Claims, 3 Drawing Sheets

US 9,341,261 B2

TORQUE CONVERTER CLUTCH CONTROL VALVE SYSTEM

FIELD

The present disclosure relates to a control system for an automatic transmission. More specifically, the present disclosure relates to a torque converter clutch control valve system for an automatic transmission.

BACKGROUND

The statements in this section merely provide background information related to the present disclosure and may or may not constitute prior art.

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The hydraulic control system includes a torque converter clutch control valve system that changes the flow of hydraulic fluid inside the torque converter equipped with a lockup clutch. The torque converter can then be employed in a "lockup clutch—open" state and a "lockup clutch—closed" state. In the open state, the torque converter control valve is intended to provide sufficient flow of hydraulic fluid through the torque converter to cool it. When the torque converter control valve is in the closed state, the torque converter control valve reverses and reduces the flow of hydraulic fluid through the torque converter as compared to the open state. If, however, the torque converter control valve fails in between the open and closed states or sticks in the closed state without limiting the lockup clutch speeds inside the torque converter, heat is generated inside the torque converter without sufficient flow of hydraulic fluid to cool the torque converter, which leads to hazardous high temperature conditions.

Accordingly, there is a need for a torque converter clutch control valve system that provides detection of the torque converter control valve in a faulted state.

SUMMARY

A torque converter clutch (TCC) control valve system for a motor vehicle transmission includes a dual valve assembly with a first exhaust line that opens to air and a TCC control valve assembly with a second exhaust line that opens to air. The TCC control valve assembly communicates with the dual valve assembly through a fluid line, and the TCC control valve assembly further communicates with a torque converter having a lockup clutch. When the lockup clutch is in a faulted open state, air is drawn into the dual valve assembly through the first exhaust line. The air flows through the dual valve assembly and from the dual valve assembly though the fluid line to portions of the TCC control valve assembly, and from the TCC control valve assembly to the torque converter. The air replaces hydraulic fluid in the torque converter, and the displaced hydraulic fluid from the torque converter exits through the second exhaust line.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
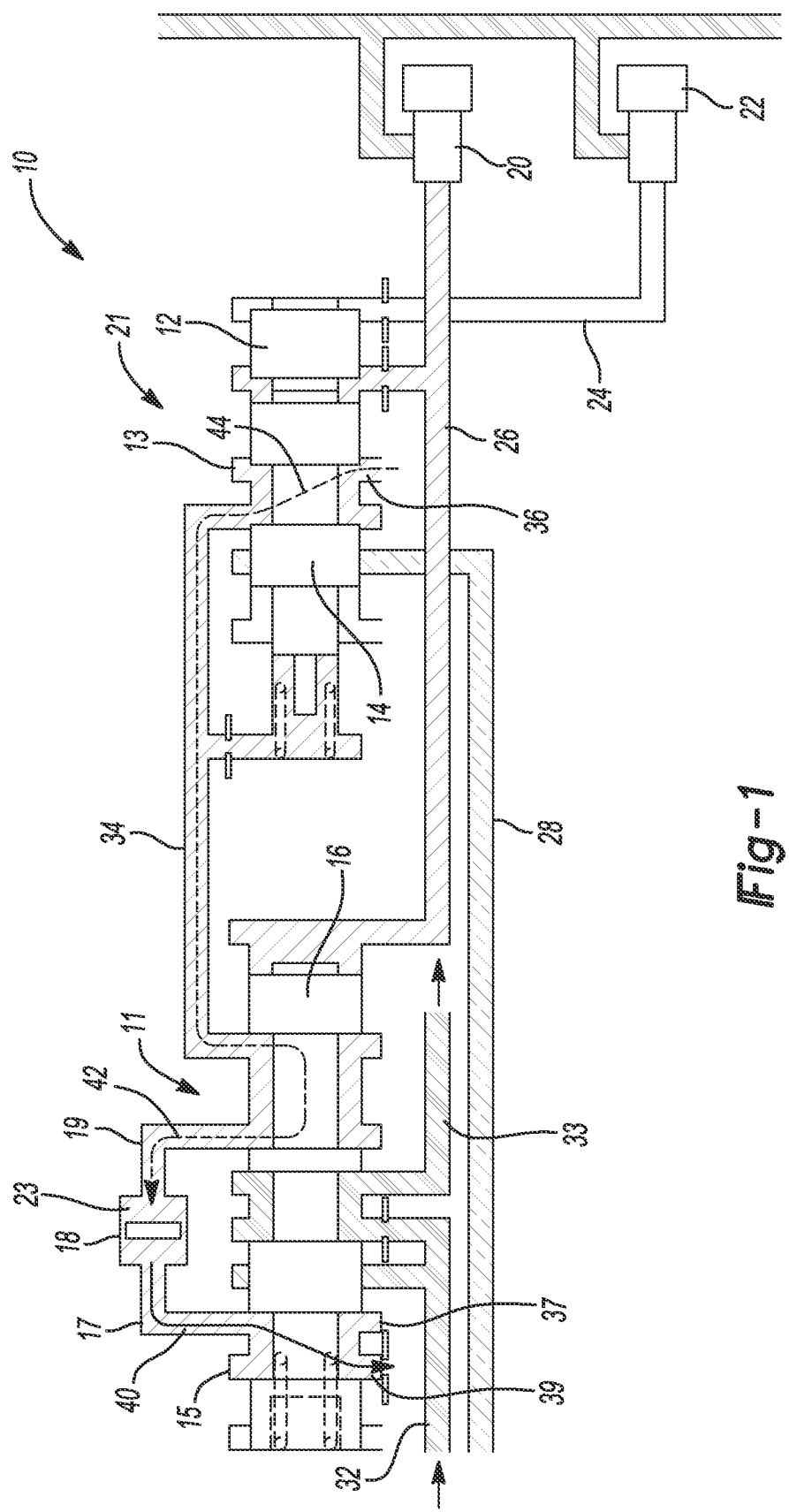
FIG. 1 is a diagram of a torque converter clutch control valve system in a faulted state.

Referring now to the drawings, a torque converter clutch (TCC) control valve system for a motor vehicle transmission is shown in FIG. 1 at 10. The TCC control valve system 10 includes a TCC control valve assembly 11 and a dual valve assembly 21. The TCC control valve 11 assembly includes a TCC control valve 16 positioned in a bore 15, and the dual valve assembly 21 includes a TCC shuttle valve 12 and a TCC regulator valve 14 both positioned in a bore 13. The TCC control valve 16 is configured to slide within the bore 15, and the TCC shuttle valve 12 and the TCC regulator valve 14 are configured to slide with the bore 13.

The various components of the TCC control valve system 10 operate and communicate with each other with regulated hydraulic fluid, such as transmission oil, throughout the TCC control valve system. A first solenoid 20, such as a variable bleed solenoid, actuates the TCC control valve assembly 11 and the dual valve assembly 21 through a fluid line 26, and a second solenoid 22 actuates the TCC shuttle valve 12 through a fluid line 24. The TCC control valve assembly 11 communicates with the dual valve assembly 21 through a fluid line 34. A fluid line 32 provides source hydraulic fluid to the TCC control valve assembly 11, and hydraulic fluid exits the TCC control valve assembly 11 through a fluid line 33. A fluid line 28 provides source hydraulic fluid to the dual valve assembly 21. The TCC control valve assembly 11 further communicates with a torque converter 18 through fluid lines 17 and 19. The torque converter 18 includes a lockup clutch 23. The lockup clutch 23 has an open state and a closed state.

When the lockup clutch 23 of the torque converter 18 operates in a normal open state, signal hydraulic fluid from the first solenoid 20 causes the TCC control valve 16 to move to the far right inside the bore 15. Specifically, the first solenoid is off and a spring within the TCC control valve assembly 11 urges the TCC control valve 16 to move toward the right side of the bore 15. As such, source hydraulic fluid from the fluid line 32 flows through the TCC control valve assembly 11 to the torque converter 18 through the fluid line 17. In the open state, the lockup clutch 23 allows the hydraulic fluid to pass through the torque converter 18. The hydraulic fluid flows through the fluid line 19 to the TCC control valve assembly 11 and exits the TCC control valve assembly 11 through the fluid line 33. Accordingly, heat generated in the torque converter 18 because of high slip speeds across the torque converter 18 is removed by the hydraulic fluid as the fluid flows through the torque converter 18 when the lockup clutch 23 is in a normal open state.

When the lockup clutch 23 operates in a normal closed state, which can be indicated with the lockup clutch 23 positioned to the left inside the torque converter 18, the first solenoid is turned on so that signal hydraulic fluid from the first solenoid 20 causes the TCC control valve 16 to more to the far left in the bore 15 and the TCC regulator valve 14 to move to the left away from the TCC shuttle valve 12 in the bore 13. Further, the lockup clutch 23 closes off fluid flow to the line 17. Hence, little or no cooling hydraulic fluid flows through the torque converter 18. The lockup clutch 23 limits slip speeds in the torque converter 18 and hence limits heat generation from the torque converter 18. Some hydraulic fluid may leak from the TCC control valve assembly 11 through a port 37.

When the lockup clutch 18 of the TCC control valve system 10 operates in a faulted open state, as indicated in FIG. 1, the first solenoid 20 is turned off, but the spring inside the TCC control valve assembly 11 fails to move the TCC control valve 16 to the right. With the lockup clutch 23 open, slip causes heat to build up inside the torque converter 18. That is, the slip present in the torque converter 18 shears the hydraulic fluid that circulates inside the torque converter 18, which generates heat. Hydrodynamic effects created by the slip in the torque converter 18 produces some flow through the torque converter 18 but not a sufficient amount of flow for cooling of the torque converter 18. In particular, a small amount of hydraulic fluid 44 flows into a port 36 of the dual valve assembly 21. This fluid 42 flows through the line 34 to the torque converter 18 after it passes through the TCC control valve assembly 11. The small amount of fluid 40 passes through the torque converter 18 and exits the TCC control valve assembly 11 through a port 39.

Figure 2:
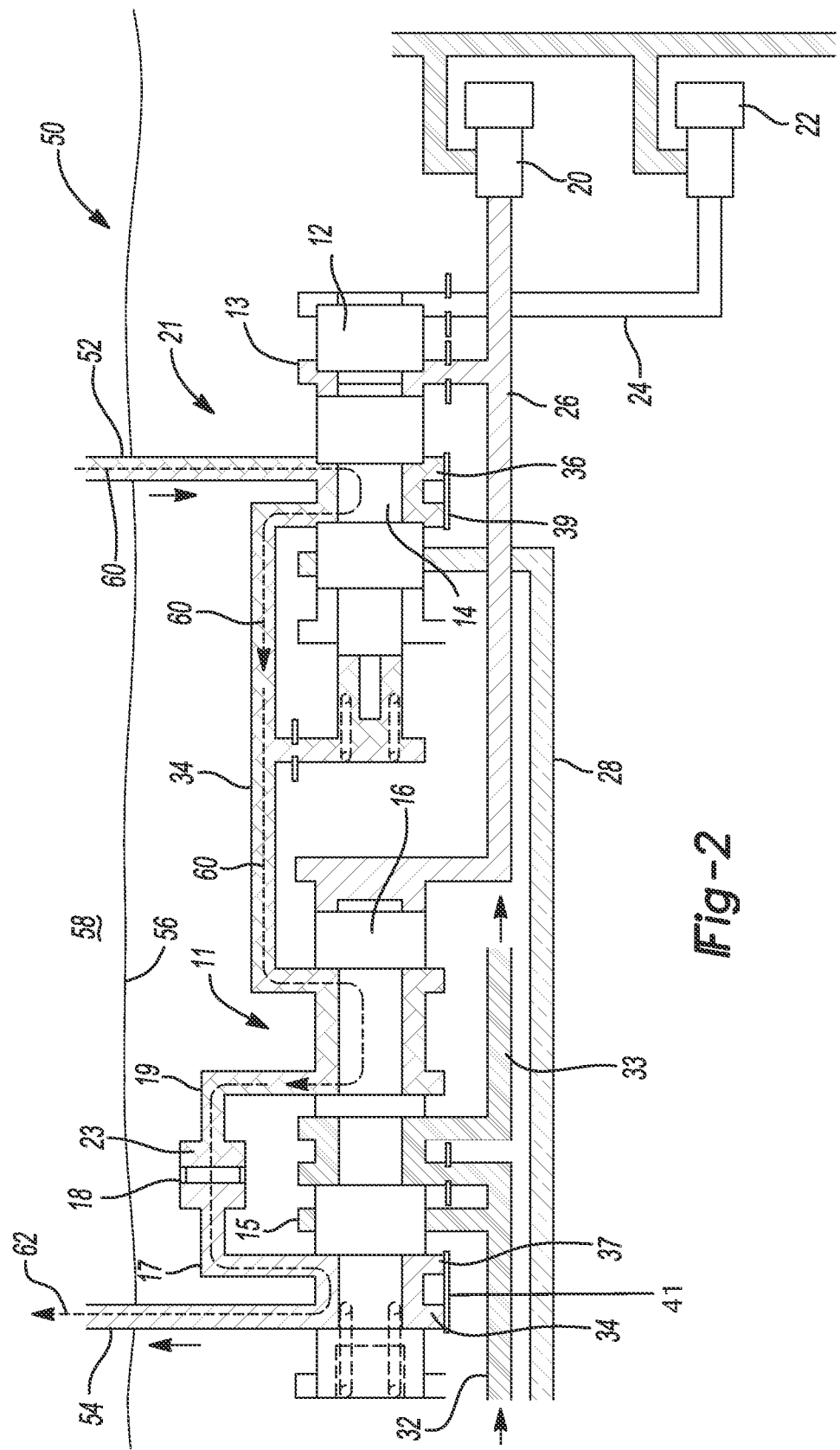
FIG. 2 is a diagram of a torque converter clutch control valve system in a faulted state in accordance with the principles of the present invention.

Turning now to FIG. 2, there is shown a TCC control valve system 50 in accordance with the principles of the present invention. In addition to the components described previously, the TCC control valve system 50 includes an exhaust line 52 that communicates with the dual valve assembly 21 and an exhaust line 54 that communicates with the TCC valve assembly 11.

When in use, the TCC control valve system 50 is immersed in hydraulic fluid with a surface 56 that separates the hydraulic fluid from air 58. The exhaust line 52 and the exhaust line 54 extend from the dual valve assembly 21 and the TCC control valve assembly 11, respectively, into the air. When the TCC control valve system 50 is operated in a faulted state with the lockup clutch 23 open, the TCC control valve 16, the TCC regulator valve 14, and the TCC shuttle valve are positioned within their respective bores 15 and 13 as shown in FIG. 2. Hence, even with the first solenoid 20 turned off, the spring within the TCC control valve assembly fails to push the TCC control valve 16 to the right side of the bore 15.

In this faulted state, a spacer plate 41 closes off the ports 34 and 37 such that the flow of fluid is directed though the exhaust line 54, and a spacer plate valve 39 closes off the port 36 such that the flow of fluid enters through the exhaust line 52. As the TCC control valve system 50 continues to operate in the faulted state, air 60 is drawn into the exhaust 52. The air 60 flows through the dual valve assembly 21 into the line 34. The air 60 continues to flow through the TCC control valve assembly 11 into the fluid line 19 toward the torque converter 18. As the air 60 continues to flow through the fluid line 17, the air 60 forces hydraulic fluid 62 out of the TCC control valve assembly 11 through the exhaust 54. Hence, hydraulic fluid in the lines 52, 34, 19, 17 and 54, in the torque converter 18, and portions of the dual valve assembly 21 and the TCC control valve assembly 11 is replaced with air. Hence, routing the exhaust lines 52 and 54 so that they open into air instead of hydraulic fluid causes hydraulic fluid 62 to be pumped out of the torque converter 18 and air 60 to be pumped in. As the hydraulic fluid 62 is replace by air 60, the torque converter's ability to transmit torque is degraded. This degradation is detected, for example, with speed sensors, which indicates when the TCC control valve system 50 is in a faulted open state.

Figure 3:
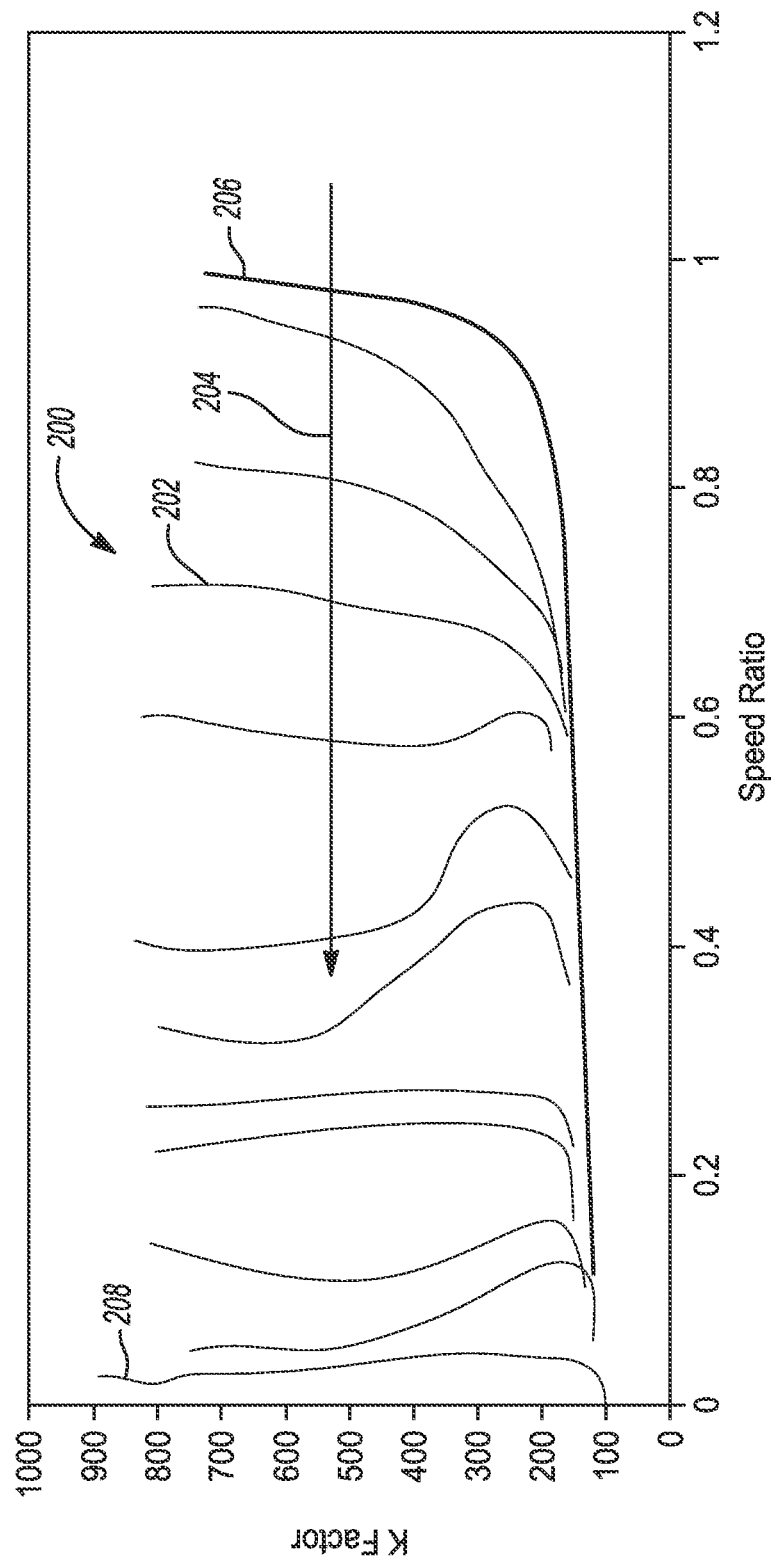
FIG. 3 is a graph representing a speed ratio vs. a K factor for the torque converter clutch control valve system shown in FIG. 2.

FIG. 3 shows a graph 200 of speed ratio vs. K factor for the TCC control valve system 50 as the TCC control valve system 50 enters into a faulted open state. The graph 200 shows a set of performance curves 202 as the hydraulic fluid in the torque converter 18 is replace with air. Initially, the torque converter 18 is full of hydraulic fluid and the torque converter 18 operates along the curve 206. As air displaces the hydraulic fluid in the torque converter 18, the performance curve moves toward the left as indicated by the arrow 204, until the torque converter 18 is filled mostly with air. The performance of the torque converter 18 when it is filled with mostly air is indicated by the performance curve 208. Hence, the graph 200 clearly indicates that the speed ratio of the torque converter 18 diminishes as it becomes filled with air, which indicates that the torque converter's 18 ability to transmit torque is degraded with the torque converter 18 is filled with air. The diminishing speed ratio is detected, for example, with speed sensors to indicate that the torque converter is operating in a faulted open state.

In some arrangements, the TCC control valve assembly 11 and the dual valve assembly 21 can be replaced with a single TCC regulator valve 14. In other arrangements, one or more valve assemblies can be added to the TCC control valve system 50 in addition to the TCC control valve assembly 11 and the dual valve assembly 21.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque converter clutch (TCC) control valve system for a motor vehicle transmission, the TCC control valve system comprising:
    a dual valve assembly with a first exhaust line that opens to air;
    a TCC control valve assembly with a second exhaust line that opens to air, the TCC control valve assembly communicating with the dual valve assembly through a fluid line, the TCC control valve assembly communicating with a torque converter having a lockup clutch,
    wherein when the lockup clutch is in a faulted open state, air is drawn into portions of the dual valve assembly through the first exhaust line, air flowing from the dual valve assembly through the fluid line to portions of the TCC control valve assembly, air flowing from the TCC control valve assembly to the torque converter, wherein air replaces hydraulic fluid in the torque converter, and wherein the displaced hydraulic fluid from the torque converter exits through the second exhaust line.

2. The TCC control valve system of claim 1 wherein the replacement of hydraulic fluid in the torque converter with air degrades the torque converter's ability to transmit torque.

3. The TCC control valve system of claim 2 wherein the degradation of the torque converter's ability to transmit torque is indicated by a diminishing speed ratio.

4. The TCC control valve system of claim 3 wherein the diminishing speed ratio indicates that the torque converter is in a faulted open state.

5. The TCC control valve system of claim 1 further comprising a solenoid that communicates with the dual valve assembly and the TCC control valve assembly through a signal fluid line, the solenoid actuating the dual valve assembly and the TCC control valve assembly.

6. The TCC control valve system of claim 5 wherein the solenoid is a variable bleed solenoid.

7. The TCC control valve system of claim 1 wherein source hydraulic fluid is provided to the TCC control valve assembly through a source line.

8. The TCC control valve system of claim 7 wherein hydraulic fluid exits the TCC control valve assembly through an exhaust port.

9. The TCC control valve system of claim 1 wherein source hydraulic fluid is provided to the dual valve assembly through a source line.

10. The TCC control valve system of claim 1 wherein the TCC control valve assembly includes a bore and a TCC control valve slidably positioned in the bore.

11. The TCC control valve system of claim 1 wherein the dual valve assembly includes a bore and a further includes a TCC regular valve and a TCC shuttle valve slidably positioned in the bore.

12. A method of operating a torque converter clutch (TCC) control valve system when a torque converter with a lockup clutch is in a faulted open state, the method comprising:
 drawing air into an first exhaust line, the air flowing into dual valve assembly;
 pumping the air from the dual valve assembly to a TCC control valve assembly through a fluid line;
 pumping the air from the TCC control valve assembly through the torque converter; and
 pumping the air from the torque converter to a second exhaust line,
 wherein the air displaces hydraulic fluid in the torque converter, the displaced hydraulic fluid exiting through the second exhaust line.

13. The method of claim 12 wherein the replacement of hydraulic fluid in the torque converter with air degrades the torque converter's ability to transmit torque.

14. The method of claim 13 wherein the degradation of the torque converter's ability to transmit torque is indicated by a diminishing speed ratio.

15. The method of claim 14 wherein the diminishing speed ratio indicates that the torque converter is in a faulted open state.

16. The method of claim 12 further actuating the dual valve assembly and the TCC control valve assembly with a solenoid that communicates with the dual valve assembly and the TCC control valve assembly through a signal fluid line.

17. The method of claim 12 wherein the TCC control valve assembly includes a bore and a TCC control valve slidably positioned in the bore.

18. The method of claim 12 wherein the dual valve assembly includes a bore and further includes a TCC regular valve and a TCC shuttle valve slidably positioned in the bore.

19. A torque converter clutch (TCC) control valve system for a motor vehicle transmission, the TCC control valve system comprising:
 at least one valve assembly including:
 a first exhaust line that opens to air, and
 a second exhaust line that opens to air, the at least one valve assembly communicating with a torque converter having a lockup clutch,
 wherein when the lockup clutch is in a faulted open state, air is drawn into the at least one valve assembly through the first exhaust line, air flowing from the at least one valve assembly to the torque converter, wherein air replaces hydraulic fluid in the torque converter, and wherein the displaced hydraulic fluid from the torque converter exits through the second exhaust line.

20. The TCC control valve system of claim 19 wherein the at least one valve assembly is two or more valve assemblies.

* * * * *